Jan. 18, 1955  G. P. MALVESE  2,699,615
MEANS FOR MOUNTING UTILIZATION APPARATUS
ON TILTING CAB TRUCKS
Filed Nov. 12, 1952
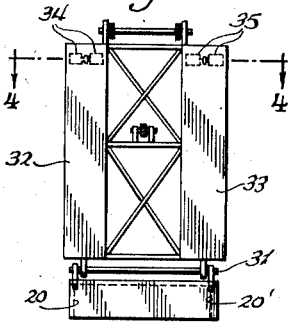
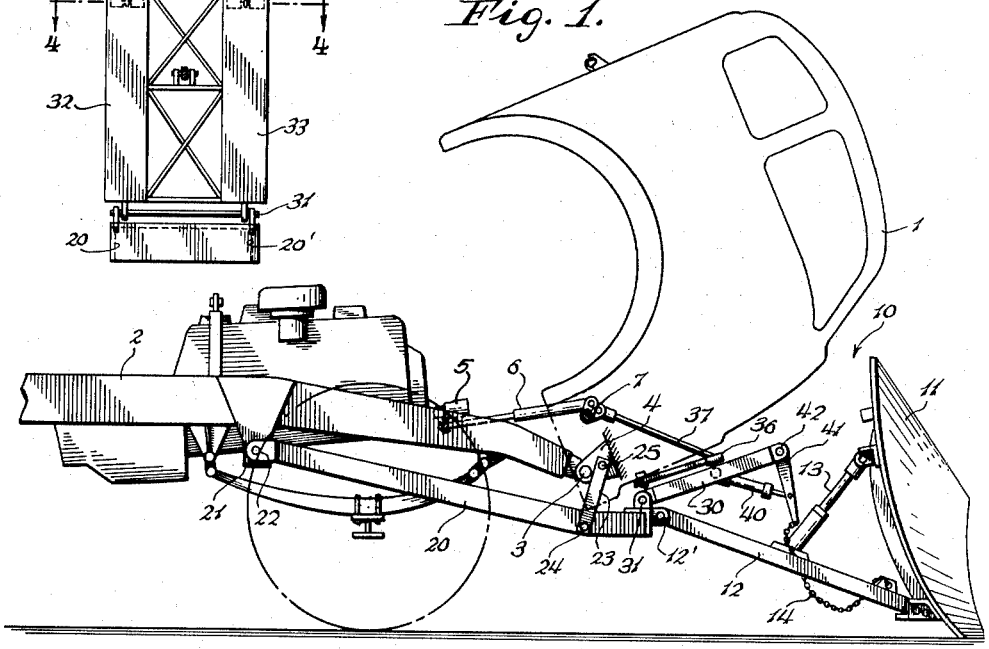
INVENTOR
GEORGE P. MALVESE
BY
John C. McGregor
ATTORNEY

United States Patent Office 2,699,615
Patented Jan. 18, 1955

2,699,615

MEANS FOR MOUNTING UTILIZATION APPARATUS ON TILTING CAB TRUCKS

George P. Malvese, Mineola, N. Y.

Application November 12, 1952, Serial No. 319,895

4 Claims. (Cl. 37—42)

This invention relates to motor trucks of the tilting cab type and more particularly to means for mounting apparatus such as snow plows on such strucks.

Snow plows, sweepers and other apparatus are frequently mounted on the front end of trucks for the purpose of clearing the streets. A recent trend in motor truck design provides trucks with tilting cabs, in which the motor is mounted underneath the cab and the entire cab is pivotally mounted so it may be tilted forwardly to provide access to the motor. This type truck presents quite a problem when it is desired to mount heavy apparatus such as snow plows and sweepers on the front of the truck. This is due to the fact that the truck main frame does not extend to the front extremity of the truck. Furthermore the cab swings about the front end of the main frame. The cab is of light construction and will not support any load; also the load would interfere with the tilting of the cab. Therefore mounting means must be provided which are oscillatable with and supported independently of the cab.

Accordingly a principal object of the invention is to provide means for mounting utilization apparatus such as snow plows and the like on the front end of a tilting cab truck.

Another object of the invention is to provide means for mounting utilization apparatus on the front end of a tilting cab truck independently of the cab.

Another object of the invention is to provide means for modifying a tilting cab truck for mounting of heavy utilization apparatus.

Another object of the invention is to provide utilization mounting means for vehicles.

These and other objects of the invention will be apparent from the following specification and drawings of which;

Figure 1 is a side view of an embodiment of the invention with the cab in the up position, Figure 2 is a side view of the embodiment of the Figure 1 with the cab in the down position.

Figure 3 is a sectional view of the embodiment of Figure 2 taken along the line 3—3, Figure 4 is a section taken along the line 4—4 of Figure 3.

Figure 1 shows a side view of an embodiment of the invention. The truck cab 1 is tiltably mounted on the main frame 2 at point 3 by means of the bracket 4. Only the one side of the main frame and one bracket is shown, but there is one on each side. The cab is shown in the up position. It normally rests on the frame above the motor 5 when in its down position, as shown in Figure 2. The tilting of the cab is actuated by the actuator rod 6 which is pivotally connected to a cross arm 7 fixed to the cab. The actuator rod is adapted to be driven by an electric motor 5, or equivalent, which is mounted on the main frame 2.

The snow plow 10, which it is desired to mount, comprises the plow surface or moldboard 11, lower bar member 12, and the hydraulic jack 13 which adjusts the angle between the lower bar member 12 and the plow surface member 11. The lower bar 12 is pivotally connected to the truck at pivot 12', and the plow is lifted off the ground by means of the chain 14. The plow is conventional and commercially available. The plow cannot be mounted directly on a truck of the tilting cab type, as can be seen from Figure 1 due to the facts that the cab tilts and also that the main frame is not directly accessible.

The mounting means of the present invention comprises a thrust bar 20, (plus one 20' on the other side which is not shown) which is pivotally mounted on the main frame by means of bracket 21. The thrust bar 20 pivots on the pivot 22 on bracket 21. The second support for the thrust bar is the supporting bar or arm 23 which is pivotally connected to the thrust bar at pivot 24, and to the cab bracket 4 at its other end, at pivot 25. Therefore as the cab swings back to its normal position, the pivot 25 moves above or slightly behind the pivot point 3 and the weight on the thrust bar will not cause any torque or moment tending to move the cab from its normal position. In normal operating position none of the weight of the snow plow will be on the cab. This is clearly shown on Figure 2, while the arrow shows the weight of the plow to be acting downwardly through the pivot point 3 along the line X.

During this movement, the thrust bar 20 is lifted by the arm 23 about its pivot point 22.

The front mounting member 30 is pivotally mounted on the front end of the thrust bar 20 at the pivot 31. Figure 3 shows a sectional view along the line 3—3 showing details of the front mounting member 30, and Figure 4 shows a section of Figure 3. The front mounting member 30 contains a pair of guide tracks or rails 32 and 33 which accommodate a pair of rollers or roller sets 34 and 35. The axles of the rollers are connected to a support bar 36 connected to cab 1 which in turn is connected to two tie rods 37 and 38 which are pivotally connected to their other end, at cross-arm 7, to the cab actuator bar 6. Therefore when the cab is rotated the front mounting member 30 is also actuated in parallel fashion so that the front of the cab and the front mounting means 30 swing together, the rollers 34 and 35 being displaced along the guide rails during the rotation. The weight of the snow plow 10 rests on the ground during the movement so that it does not load the cab actuating means. When the cab is in normal position with the front member 30 in substantially vertical position, the plow is raised off the ground by means of the hydraulic jack 40 with actuates the arm 41 about the pivot 42 thereby putting tension on the chain 14 and lifting the plow member 11 off the ground to the desired height.

Therefore it is seen that the entire weight of the mounting means and the utilization apparatus is supported by the main frame at pivot 3 and at pivot 7 through the rods 37 and 38. The thrust caused by the plow bearing against a load of snow is transmitted back to the main frame by means of the thrust bars 20 and 20'. It has also been shown that the mounting means does not interfere with the free tilting of the cab. Heretofore it has been necessary to remove the mounting means and the plow in order to rotate the cab.

The invention is not limited to the particular utilization apparatus shown since it is adaptable for many industrial and construction applications. The invention is not limited for use with trucks but may be utilized with tractors, bulldozers or other equipment where it is desired to employ the teachings of the invention.

I claim:

1. Means for mounting a snow plow on a tilting cab truck comprising a main frame, a pair of bracket members fixedly connected to said cab and oscillatably connected to said main frame, a pair of thrust bars, having one end pivotally connected to said main frame, a pair of supporting bars pivotally connected at one end to said bracket members and pivotally connected at their other end to said thrust bars, and means pivotally connected to the front end of said thrust bars for supporting said snow plow.

2. Apparatus as in claim 1 wherein the pivot point between said supporting bar and said bracket member is above and behind the pivot point between said supporting bar and said thrust member when said cab is in the normal down position.

3. Means for mounting utilization means on the front of a tilting cab truck comprising a truck main frame, a cab, a pair of oscillatable members pivotally connecting said cab to said main frame, a pair of thrust bars pivotally connected at one end to said main frame, a pair of supporting bars each pivotally connected at one end to one of said rotatable members and at their other end to one of said thrust bars, front mounting means pivotally connected to the front end of said thrust bars, said front mounting means comprising guide rails, rollers adapted to roll in said guide rails, means including rod means connecting said rollers and said main frame, said utilization means being connected to said guide rails.

4. Means for mounting utilization means on the front of a tilting cab truck comprising a truck main frame, a cab, a pair of oscillatable members pivotally connecting said cab to said main frame, a pair of thrust bars pivotally connected at one end to said main frame, a pair of supporting bars each pivotally connected at one end to one of said oscillatable members and at their other end to one of said thrust bars, front mounting means pivotally connected to the front end of said thrust bars at its bottom end, tie rod means adjustably connecting said front mounting means to said main frame whereby said front mounting means is oscillatable with but supported independently of said cab.

References Cited in the file of this patent

UNITED STATES PATENTS

| | | |
|---|---|---|
| 2,210,519 | Wollensak | Aug. 6, 1940 |
| 2,242,826 | Keeler | May 20, 1941 |
| 2,362,453 | Cosper | Nov. 14, 1944 |
| 2,431,495 | Mosser | Nov. 25, 1947 |